United States Patent
Arakelyan

(10) Patent No.: US 10,130,049 B2
(45) Date of Patent: *Nov. 20, 2018

(54) AUTOMATED WIDE-RANGING (LARGE-SCALE) ANTI-HAIL PROTECTION METHOD AND A NETWORK

(71) Applicant: Artashes Arakelyan, Yerevan (AM)

(72) Inventor: Artashes Arakelyan, Yerevan (AM)

(*) Notice: Subject to any disclaimer, the term of this patent is extended or adjusted under 35 U.S.C. 154(b) by 0 days.

This patent is subject to a terminal disclaimer.

(21) Appl. No.: 15/350,531

(22) Filed: Nov. 14, 2016

(65) Prior Publication Data

US 2017/0055464 A1 Mar. 2, 2017

Related U.S. Application Data

(63) Continuation of application No. 14/369,802, filed as application No. PCT/AM2012/000003 on Jul. 9, 2012, now Pat. No. 9,491,912.

(30) Foreign Application Priority Data

Mar. 20, 2012 (AM) .................................. 20120049

(51) Int. Cl.
*A01G 15/00* (2006.01)
*A01G 13/00* (2006.01)
*G01W 1/06* (2006.01)

(52) U.S. Cl.
CPC ............. *A01G 15/00* (2013.01); *A01G 13/00* (2013.01); *G01W 1/06* (2013.01)

(58) Field of Classification Search
CPC .......... A01G 13/00; A01G 15/00; G01W 1/06
(Continued)

(56) References Cited

U.S. PATENT DOCUMENTS 3,645,446 A 2/1972 Patten
3,848,801 A 11/1974 Ollivier et al.
(Continued)

FOREIGN PATENT DOCUMENTS

AM 2190 6/2008
AM 2370 2/2010
(Continued)

OTHER PUBLICATIONS

Wesite http://vgistikhiya.ru/private/antigrad.pdf.
(Continued)

*Primary Examiner* — Darren W Gorman
*Assistant Examiner* — Steven M Cernoch
(74) *Attorney, Agent, or Firm* — Brooks Kushman P.C.

(57) ABSTRACT

The present invention relates to hail warning and prevention. An automated method of wide-ranging anti-hail protection including reception of sky proper radiothermal emission in M sites, its comparison with corresponding thresholds, generation command signals to detonate combustible gas and to direct shock waves upwardly to the sky, generation and transmission alert signals, reception of transmitted alert signals in each M sites, comparison with proper code-signals of that site and setting alert operational mode of sonic generator.

An automated network of anti-hail protection including M hail preventing sonic set in M sites of anti-hail protection area any of which comprises an antenna, a radiometric receiver, a controlled compensation device, a controlled multi-channel threshold system, a warner a transmitter, a receiver, a code-signal comparison device, a first controlling switcher, a controlled single-channel thresholder and a second controlling switcher.

It is enhanced operation efficiency and is automated exploitation of an anti-hail protection network.

22 Claims, 9 Drawing Sheets

(58) Field of Classification Search
USPC .................................................. 239/2.1, 14.1
See application file for complete search history.

(56) References Cited

U.S. PATENT DOCUMENTS

| | | | | |
|---|---|---|---|---|
| 4,080,149 | A | * | 3/1978 | Wolfe .................... F23C 15/00 236/1 H |
| 4,767,313 | A | * | 8/1988 | Lockwood, Jr. .......... F02G 1/02 431/1 |
| 5,044,929 | A | * | 9/1991 | Tabuchi ................. F23C 15/00 431/1 |
| 5,381,955 | A | | 1/1995 | Ollivier |
| 5,411,209 | A | | 5/1995 | Ollivier |
| 5,445,321 | A | | 8/1995 | Ollivier |
| 5,975,424 | A | | 11/1999 | Swindeman et al. |

FOREIGN PATENT DOCUMENTS

| | | |
|---|---|---|
| AM | 2505 | 12/2010 |
| RU | 2083999 C1 | 7/1997 |
| RU | 1839961 C | 6/2006 |

OTHER PUBLICATIONS

Website www.barva.am/AM/Technology.html.
Website www.meteo-radar.com/us/skydetect_radars.htm—a prototype.
A.K. Arakelyan et al., "Multi-frequency and multi-polarization measurements of water surface radar cross section and brightness temperature changes due to clouds and rain," Electromagnetic Waves and Electronic Systems, vol. 15, Nos. 11, 2010, pp. 52.60 (in Russian).
Melanya L. Grigoryan et al., "Clouds and Rain Effects on Perturbed Water Surface Microwave Reflection and Emission at 37 GHz," Ocean sensing and Monitoring II, edited by Weilin (Will) Hou and Robert A. Arnon, Proceedings of SPIE, vol. 7678, 2010, pp. 76780D-1-76780D-8.
Artashes K. Arakelyan et al., "Multi-Frequency and Polarimetric Measurements of Perturbed Water Surface Microwave Reflective and Emissive Characteristics by C-, and Ku-Band Combined Scatterometric-Radiometric Systems," Ocean sensing and Monitoring II, edited by Weilin (Will) Hou and Robert A. Amon, Proceedings of SPIE, vol. 7678, 2010, pp. 76780C-1-76780C-8.
A.K. Arakelian "An Analysis of Characteristics of Temperature-Wind Variations of Sea Surface Brightness Temperature," Izvestia RA, Series of Fizika Atmosferi i Okeana, 1992, vol. 28, No. 2, pp. 196-205 (in Russian).
Melanya L. Grigoryan, et al., "Angular and Polarization Measurements of Snow and Bar Soil Microwave Reflective and Emissive Characteristics by Ka-Band (37 GHz), Combined Scatterometer-Radiometer System," Remote Sensing for Agriculter, Ecosystems and Hydrology XIII, edited by Christopher M.U. Neale, Antonio Maltese and Katja Richter, Proceedings of SPIE, 0277-786X, vol. 8174, 2011, pp. 81742C-1-81742C-9.

* cited by examiner

AUTOMATED WIDE-RANGING (LARGE-SCALE) ANTI-HAIL PROTECTION METHOD AND A NETWORK

CROSS-REFERENCES TO RELATED APPLICATIONS

This application is a continuation of U.S. application Ser. No. 14/369,802 filed Jun. 30, 2014, now U.S. Pat. No. 9,491,912 issued Nov. 15, 2016, which, in turn, claims priority from international patent application Serial No. PCT/AM2012/000003, filed Jul. 9, 2012 which claims priority from Armenian Application No. 20120049 filed Mar. 20, 2012, the disclosures of which are hereby incorporated by reference herein in their entireties.

FIELD OF THE INVENTION

The present invention relates to hydrometeorology, in particular, active methods and devices for acting on atmospheric formations and their controlling, hail alerting and prevention, and may be used for automatic realization of anti-hail protection of agricultural fields, orchards, vegetable gardens and various public and social objects.

BACKGROUND

Several methods of wide-ranging (large-scale) anti-hail protection are known in the art. It is known a wide-ranging anti-hail protection method with an active effect (impact) on hail clouds by shells or rockets which spread reagents or aerosol in clouds.

It is known as well an anti-hail protection method with (including) an active effect (impact) on hail clouds by significant (powerful) shock waves directed upwardly to the sky. It is believed that the succession of shock waves transports positive ions from ground level to cloud level which disrupt formation of hail nuclei. Wide-ranging application of this method of anti-hail protection is fulfilled by the following way. Supersonic and significant shock waves are generated and are directed upwardly to the sky in any (each, every) site of an anti-hail protected (protection) area of M sites by sequential (serial) detonating an explosive mixture of combustible gas (combustible fuel) and air in a combustion chamber (in an enclosed body) of any (each, every) of M hail preventing sonic generators (an anti-hail shock wave generators) are spatially distributed (positioned, are placed) in M sites (points) of the anti-hail protected area of M sites. By selecting material and quantity of the combustible fuel, number and duration of detonations it is possible to provide significant shock waves and to effect on the hail clouds up to 10 km of altitude, changing hail cloud structure, preventing further development of hail and transforming hail to (into) rain, to wet snow or to small ice drops. As the fuel or combustible gas may be used acetylene gas, a mixture of propane-butane gases or other gas or liquid fuel with high energy capabilities. The explosive mixture of injected into the combustion chamber combustible gas and air is detonated by an inside located igniter in accordance with external command signals incoming from a controller (a control means). These command signals are created in the controller by an assisting (service) operator (staff) manually or remotely by means of cell phone GSM system, by radio aids (by radio technical devices), by means of radio communication, by means of telephone communication, or by other technical means of communication.

It is known as well an anti-hail protection method using shock waves when simultaneously with the injecting of the combustible gas a reagent (argentum iodide, for instance) is injected into the combustion chamber and is mixed with the explosive mixture of combustible gas and air. Coming up small particles of the burned reagent immediately (directly) effect on the process of hail forming in addition to the shock waves impact.

Known anti-hail protection methods have some limitations (disadvantages) related to the absence of automatic operation and self-management (self-controlling) capabilities. Known anti-hail protection methods are operated only when corresponding commands come from the assisting (service) operator (staff), which includes subjective factor, or when corresponding commands came from an anti-hail radar station (weather radar station) which is a very expensive one and needs specific (special) exploitation conditions, besides it is not always possible to get (to receive) the commands from the anti-hail radar station, or these commands are not always contained (included) correct (real) information about hail situation and stage regarding the protected (considered or specified) area. However, to achieve by shock waves successful and good results in wide-ranging anti-hail protection it is necessary in the given (specified) site of shock wave generator's impact area (typically a 500-600 m radius) to start detonations automatically, without the human action, at least 5-10 minute prior (before) a hail storm.

Current method of wide-ranging application (utilization) of shock wave method, which is more fit (match) to the present invention, comprises generation supersonic and significant shock waves in any (each, every) site of the anti-hail protected area of M sites by sequential (serial) detonating an explosive mixture of preliminary injected combustible gas (combustible fuel) and air in a combustion chamber (in an enclosed body) of the hail preventing sonic generator of that site (corresponding site) and direction the shock waves upwardly to the sky, wherein the preliminary injection (injecting) before each detonating of the combustible gas into the combustion chamber and the detonating of the explosive mixture of the preliminary injected combustible gas and air in the combustion chamber by an inside located igniter are performed in accordance with the command signals incoming from the controller (control means) of that site, wherein the external command signals are created by (in) the controller in accordance with the signals received from (transmitted by) a servant anti-hail radar station of that site remotely by means of cell phone GSM system.

Current anti-hail protection method's disadvantage is its low operation efficiency due to the dearness (high price) of the automatic exploitation of wide-ranging anti-hail protection network, since the anti-hail radar station costs very expensive, and due to the absence of self-management (self-controlling) capabilities.

Current wide-ranging anti-hail protection network which realizes in practice the above mentioned anti-hail protection methods and which is more fit to the present invention, includes M independently operating hail preventing sonic generators (anti-hail shock wave generators) spatially distributed (positioned, are placed) in M sites of the anti-hail protected area of M sites, any one of M hail preventing sonic generators comprises a cylindrical combustion chamber having a neck with an upper orifice, a conical barrel, air inlet ports provided with flaps, a fuel supply system (fuel injection means), an ignition means and an igniter, a control means and a power supply.

Current wide-ranging anti-hail protection network's disadvantage is its low operation efficiency due to the dearness of the automatic exploitation of wide-ranging anti-hail protection network and the absence of self-management (self-controlling) capabilities, since all M spatially distributed in M sites of the anti-hail protected area of M sites hail preventing sonic generators are controlled by one controlling center, by the anti-hail radar station which costs very expensive, needs specific (special) exploitation conditions and is very power consuming one.

An object of the present invention is to enhance operation efficiency of the wide-ranging anti-hail protection network and to automate its exploitation.

SUMMARY OF THE INVENTION

The present invention proposes to overcome the limitation of the prior art with an wide-ranging anti hail protection method and with an wide-ranging anti-hail protection network. The wide-ranging anti-hail protection method is altered and the wide-ranging anti-hail protection network is configured for automatic detection of hail clouds by estimation of sky brightness temperature (by measuring the power of sky proper radio thermal emission) and for realization automatic operation and self management capabilities for the wide-ranging anti-hail protection network.

The automated wide-ranging (large-scale) anti-hail protection method according to the invention comprises:

a) Receiving in (from) any (each, every) site of an anti-hail protected (protection) area of M sites signals of that site's (corresponding site's) sky proper radio-thermal emission;

b) squaring of the received signals of sky proper radio thermal emission;

c) accumulation of the squared signals;

d) comparison of the accumulated signals with N thresholds;

e) outputting (transferring) "one" ("1") signal to a corresponding output of any of the N thresholds if its input signal exceeds the respective threshold, and a "zero" (naught, "0") signal otherwise;

f) considering jointly a set of the output (transferred) "one" and "zero" signals as a binary number in a binary code and creating (generation) a binary number code-signal corresponding to the binary number;

g) generation a warning code-signal in accordance with the binary number code-signal;

h) transferring by (through, via) electrical cords the warning code-signal to a controller (a control means) of a hail preventing sonic generator (an anti-hail shock wave generator) of that site (corresponding site);

i) setting by (in) the controller an operation mode of said hail preventing sonic generator of that site (corresponding site), such as a switching-on mode, a waiting mode, an operating mode and a turning-off mode, in accordance with received by the controller the transferred warning code-signal, wherein the operating mode is set when the transferred to (received by) the controller the warning code-signal has value "1" and more, the waiting mode is set when the transferred to (received by) the controller the warning code-signal has value "0", the turning-off mode is set when the transferred to (received by) the controller the warning code-signal gets upper-range (maximum) value of the binary number results when to any of the outputs of the N thresholds is outputted the "one" signal, and the switching-on mode is set when after the turning-off mode next the "0" value warning code-signal comes (is transferred) to the controller, the number N is defined on the basis of technical capabilities of the hail preventing sonic generator of that site (corresponding site);

j) setting by (in) the controller operation parameters of the hail preventing sonic generator of that site (corresponding site), such as power and duration of detonations, number of detonations and a detonation window, in accordance with the received by the controller the transferred warning code-signal;

k) generation command (control) signals by (in) the controller in accordance with the set mode of operation and the set operation parameters of the hail preventing sonic generator of that site (corresponding site);

l) generation supersonic and significant shock waves by sequential (serial) detonating an explosive mixture of preliminary injected combustible gas (combustible fuel) and air in a combustion chamber (in an enclosed body) of the hail preventing sonic generator of that site (corresponding site) and direction the shock waves upwardly to the sky, wherein the preliminary injection (injecting) before each detonating of the combustible gas into the combustion chamber and the detonating of the explosive mixture of the preliminary injected combustible gas and air in the combustion chamber by an inside located igniter are performed in accordance with the command signals incoming from the controller (control means), the command signal corresponding to the operating mode of operation triggers the hail preventing sonic generator of that site (corresponding site), the waiting mode of operation keeps the hail preventing sonic generator in operational readiness, the turning-off mode of operation interrupts the detonations and switchs off the hail preventing sonic generator of that site (corresponding site), the switching-on mode of operation switchs on the hail preventing sonic generator of that site (corresponding site) and sets the waiting mode of operation for the hail preventing sonic generator of that site (corresponding site);

m) generation in any (each) site of the anti-hail protected area of M sites an alert code-signal simultaneously with the setting of the operating mode of the hail preventing sonic generator of that site;

n) transmission on the air by radio waves the alert code-signal;

o) listening watch (ether) in any (each) site of the anti-hail protected area of M sites simultaneously with the setting of the waiting mode of the hail preventing sonic generator of any (each) site of the anti-hail protected area of M sites for reception of the transmitted on the air from any (each) site of the anti-hail protected area of M sites the alert code-signal (or signals);

p) reception in each (any) site of the anti-hail protected area of M sites the transmitted from the any (each) site of the anti-hail protected area of M sites the alert code-signal (or signals);

q) comparison in each (any) site of the anti-hail protected area of M sites the received alert code-signal with L proper code-signals of the site;

r) generation in each (any) site of the anti-hail protected area of M sites an alert signal if the received alert code-signal coincides with any of the L proper code-signals of the site, and a "zero" (naught, "0") signal otherwise; and s) setting an alert operating mode for the hail preventing sonic generator of the site, in accordance with the generated alert signal, wherein the accumulated signals of the site is compared with an alert threshold, an alerting code-signal is generated and is outputted (is transferred) to a corresponding output of the alert threshold (thresholder) if the accumulated signal of the site exceeds the alert threshold, and a "zero" (naught, "0") signal otherwise, the alerting code-signal is transferred by (through, via) electrical cords to the controller of the site, the controller of the site is generated an alert command (control) signal, and the hail preventing sonic generator of the site is started up in accordance with the generated alert command signal at (by, under) specified operational conditions of the alert operating mode, the alert operating mode of the hail preventing sonic generator of the any site of the anti-hail protected area of M sites is turned-off (switched-off) simultaneously with interrupting the alert code-signal corresponding to the site, or with setting the operating mode or the turning-off mode of operation of the hail preventing sonic generator of the site.

t) Besides, the receiving of signals of the site's (corresponding site's) sky proper radio thermal emission may be fulfilled at any distance away (far) from the hail preventing sonic generator of the site, at (under) any elevation angle of sensing, at any allowed central radio frequency from L to W-band of microwave, at any interference (noise) free bandwidth of receiving (reception), and at any polarization of sensing.

u) Besides, the wide-ranging anti-hail protection method comprises injecting a reagent together with said combustible gas into said combustion chamber and mixing said reagent with said combustible gas before said combustible gas detonating in any (in each, in every) site of said anti-hail protected area of M sites.

v) Besides, the warning code-signal and the alerting code-signal of the site are transmitted to the controller of the site by radio waves.

w) Besides, the wide-ranging anti-hail protection method comprises continuous (uninterrupted) or periodically (occasionally, intermittently) receiving from (in) K points (places) signals of the anti-hail protected area's adjacent land (site) corresponding sky proper radiothermal emission all around the anti-hail protected area of M sites, squaring of the received signals of the adjacent land's corresponding sky proper radio thermal emission, accumulation of the squared signals of the adjacent land, comparison of said accumulated signals of the adjacent land with a minimum threshold, generation in any (each) site of the K points an alert code-signal on (about) gathering (coming, impending) hail danger from the adjacent land if the accumulated signal of the adjacent land exceeds the minimum threshold, transmission on the air by radio waves the alert code-signal on gathering hail danger, and reception of the transmitted alert code-signal on gathering hail danger in each (any) site of the anti-hail protected area of M sites.

x) Besides, the generated and the transmitted on the air the alert code-signal and/or the alert code-signal on gathering hail danger from the adjacent land is received by a main control (controlling) center, the received by the main control center the alert code-signal and/or the alert code-signal on gathering hail danger from the adjacent land is processed by (in) the main control center, the processed signal is retransmitted on the air by radio waves and the retransmitted signal is received in each (any) site of the anti-hail protected area of M sites.

The automated wide-ranging anti-hail protection network according to the invention includes M anti-hail protection systems spatially distributed (positioned, are placed) in M sites of the anti-hail protected area of M sites, wherein the any one of the M anti-hail protection systems comprises:

a) a hail preventing sonic generator (an anti-hail shock wave generator) for generation of a shock wave by detonating an explosive mixture of combustible gas (combustible fuel) and air in an enclosed body and direction of the generated shock wave resulting from the explosion upwardly to the sky;

b) a fuel supply system (fuel injection means) for injecting the combustible fuel to the hail preventing sonic generator, the fuel supply system being in communication with said hail preventing sonic generator;

c) an ignition means (a high voltage generator) for generation of high voltage spike (step, potential) for igniting the combustible fuel in the hail preventing sonic generator;

d) a control means for creating command signals for the hail preventing sonic generator operation, for controlling the combustible fuel supplying into the hail preventing sonic generator and the supplied combustible fuel igniting in the hail preventing sonic generator, the control means being in electrical communication with the fuel supply system and with the ignition means;

e) a power supply, the power supply being in electrical communication with the control means and with the ignition means; and f) a detector-warner (detector-alerter), for hail detection and for the warning and the alerting signals creation for controlling the control means, for creation the alert signal and the alert code-signal, for transmission and reception the alert code-signal, the detector-warner being in electrical communication with the control means and with the power supply.

g) Besides, the any of the hail preventing sonic generator includes a cylindrical combustion chamber having a neck with an upper orifice, and air inlet ports provided with flaps, which are seated in the air inlet ports and open inwardly to provide one way valves for air rushing into the combustion chamber after each ignition, the air inlet ports area is larger of the upper orifice area of the neck, a conical barrel having a small diameter lower end connected to the upper orifice of the neck and a large diameter upper end, a fuel injector for injecting the supplied combustible fuel into the combustion chamber of the hail preventing sonic generator, the fuel injector being in communication with the combustion chamber and with the fuel supply system and being in electrical communication with the control means, and an igniter for sparking and igniting the explosive mixture of combustible gas (combustible fuel) and air, the igniter being located inside (in) the combustion chamber and being in electrical communication with the ignition means, the ignition means being located inside or outside of the combustion chamber.

h) Besides, the fuel supply system includes a combustible fuel reservoir, a mechanical valve, the mechanical valve being in communication with the combustible fuel reservoir, a solenoid valve, the solenoid valve being in communication with the mechanical valve and being in electrical communication with the control means, and a pressure regulator (a pressure reducer), the pressure regulator being in communication with the solenoid valve and with the fuel injector.

i) Besides, the detector-warner includes an antenna, for receiving signals of corresponding site's sky proper radio thermal emission, a radiometric receiver for measuring a power of the receiving signals of corresponding site's sky proper radio thermal emission and estimating sky brightness (apparent) temperature, the radiometric receiver being in electrical communication with the antenna and with the power supply, a controlled compensation device (circuit), the controlled compensation device being in electrical communication with the radiometric receiver and with the power supply, a controlled multi-channel thresholder for hail detection, the controlled multi-channel thresholder being in electrical communication with the controlled compensation device and with the power supply, and a warning device for warning signals creation, the warning device being in electrical communication with the controlled multi-channel thresholder, with the control means and with the power supply, a transmitter for creation an alert code-signal and for transmission on the air the alert code-signal, the transmitter being in electrical communication with the warning device and with the power supply, a receiver for reception of any (each) of the transmitted from any site of the anti-hail protected area of M sites alert code-signal, the receiver being in electrical communication with the power supply, a controlled code comparator for comparison of any (each) of the received alert code-signal with the L proper code-signals of the site and for creation the alert signal, the controlled code comparator being in electrical communication with the receiver and with the power supply, a first controlled switcher, the first controlled switcher being in electrical communication with the controlled code comparator and with the controlled compensation device (circuit), a controlled single-channel thresholder for creation the alerting signal, the controlled single-channel thresholder being in electrical communication with the first controlled switcher and with the power supply, and a second controlled switcher, the second controlled switcher being in electrical communication with the controlled single-channel thresholder, with said warning device and with said control means.

j) Besides, the detector-warner includes a separate power supply for separate feeding of the detector-warner, the separate power supply being in electrical communication with the radiometric receiver, with the controlling compensation device (circuit), with the controlling multi-channel thresholder, with the warning device, with the transmitter, with the receiver, with the controlled code comparator and with the controlled single-channel thresholder.

k) Besides, the detector-warner may be placed at any distance away (far) from the hail preventing sonic generator of the site and may measure the corresponding site's sky proper radio thermal emission at (under) any elevation and azimuth angles of sensing, at any allowed central radio frequency from L to W-band of microwave, at any interference (noise) free bandwidth of receiving (reception), and at any polarization of sensing.

l) Besides, the any of the anti-hail protection system of the anti-hail protected area of M sites comprises a remote control system for remote controlling of the control means of the site by means of cell phone GSM system, by radio aids (by radio technical devices), by means of radio communication, by means of telephone communication, or by other technical means of communication, the remote control system being in electrical communication with the warning device, with the second controlled switcher, with the control means, with the power supply and with the separate power supply.

m) Besides, the any of the remote control system includes a controlling transmitter for transmitting the created warning and alerting signals to the hail preventing sonic generator of the site, the controlling transmitter being in electrical communication with the warning device, with the second controlled switcher and with said separate power supply, and a controlling receiver for receiving the transmitted warning and alerting signals and for transferring the received warning and alerting signals by (through, via) electrical cords to the control means, the receiver being in electrical communication with the control means and with the power supply.

n) Besides, the any of the anti-hail protection system of the anti-hail protected area of M sites comprises a reagent supply system for supplying the reagent to the hail preventing sonic generator of the site, the reagent supply system being in communication with the hail preventing sonic generator of the site.

o) Besides, the any of the hail preventing sonic generator of the site comprises a reagent injector-mixer for injecting the supplied reagent into the combustion chamber of the hail preventing sonic generator of the site and mixing the reagent with the combustible fuel before the combustible fuel igniting, the reagent injector-mixer being in communication with the combustion chamber and with the reagent supply system and being in electrical communication with the control means of the site.

p) Besides, the any reagent injecting system includes a reagent reservoir, a reagent mechanical valve being in communication with the reagent reservoir, a reagent solenoid valve being in communication with the reagent mechanical valve and being in electrical communication with the control means, and a reagent pressure regulator being in communication with the reagent solenoid valve, and with the reagent injector-mixer.

q) Besides, the wide-ranging anti-hail protection network comprises a complex of spatially distributed K teledetection systems for far-ranging hail detection all around the anti-hail protection area of M sites and for alerting by transmitting on the air the alert code-signal on gathering (coming, impending) hail danger from any of the adjacent land of the anti-hail protection area of M sites.

r) Besides, the any one of the K teledetection systems comprises a far-ranging antenna for receiving signals of the adjacent land corresponding sky proper radio thermal emission, a far-ranging radiometric receiver for measuring a power of the received signals of the adjacent land corresponding sky proper radio thermal emission and for estimating of the adjacent land corresponding sky brightness (apparent) temperature, the far-ranging radiometric receiver being in electrical communication with the far-ranging antenna, a far-ranging controlled compensation device (circuit), the far-ranging controlled compensation device being in electrical communication with the far-ranging radiometric receiver, a far-ranging controlled single-channel thresholder for far-ranging hail detection, the far-ranging controlled single-channel thresholder being in electrical communication with the far-ranging controlled compensation device, a far-ranging warning device for creation the alert code-signal on gathering hail danger from the adjacent land, said far-ranging warning device being in electrical communication with said far-ranging controlled single-channel thresholder, a far-ranging transmitter for transmitting on the air the alert code-signal on gathering hail danger from the adjacent land, the far-ranging transmitter being in electrical communication with the far-ranging warning device, and a far-ranging power supply, the far-ranging power supply being in electrical communication with the far-ranging radiometric receiver, with the far-ranging controlled compensation device (circuit), with the far-ranging controlled single-channel thresholder, with the far-ranging warning device and with the far-ranging transmitter.

s) Besides, the wide-ranging anti-hail protection network comprises a main controlling center for reception, processing and retransmission of the alert code-signal or/and the alert code-signal on gathering hail danger from any of the adjacent land of the anti-hail protection area of M sites.

t) Besides, the main controlling center of the wide-ranging anti-hail protection network comprises a main receiver for reception of the alert code-signal or/and the alert code-signal on gathering hail danger from any of the adjacent land of the anti-hail protection area of M sites, a processor-analyser for processing and analysis of the received alert code-signal or/and alert code-signal on gathering hail danger from any of the adjacent land of the anti-hail protection area of M sites, the processor-analyser being in electrical communication with the main receiver, a main transmitter for retransmission of the alert code-signal or/and the alert code-signal on gathering hail danger from any of the adjacent land of the anti-hail protection area of M sites, the main transmitter being in electrical communication with the processor-analyser, and a main power supply, said main power supply being in electrical communication with the main receiver, with the processor-analyser and with the main transmitter.

Preferred aspects of the invention are defined in the accompanying claims.

BRIEF DESCRIPTION OF THE DRAWINGS

The invention will be better understood by way of the following detailed description of preferred embodiments, with reference to the appended (accompanying) drawings in which.

DETAILED DESCRIPTION OF THE PREFERRED EMBODIMENTS

Figure 1:
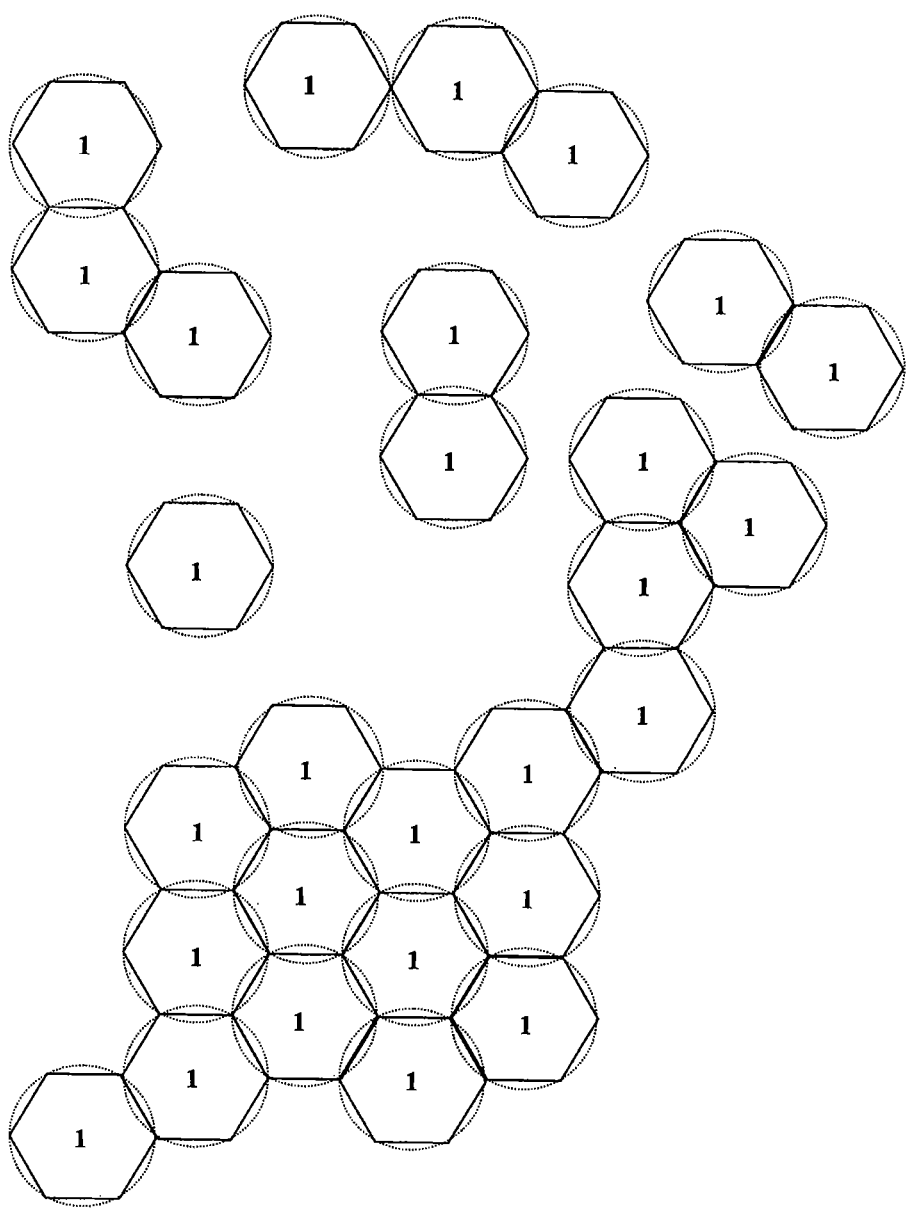
FIG. 1 is an outline of a first possible version of a spatial distribution of an embodiment of an automated wide-ranging anti-hail protection network.

FIG. 1 shows a possible outline of a location of an anti-hail protection area of M sites which is served by an automated wide-ranging anti-hail protection network of M spatially distributed anti-hail protection systems (1).

Figure 2:
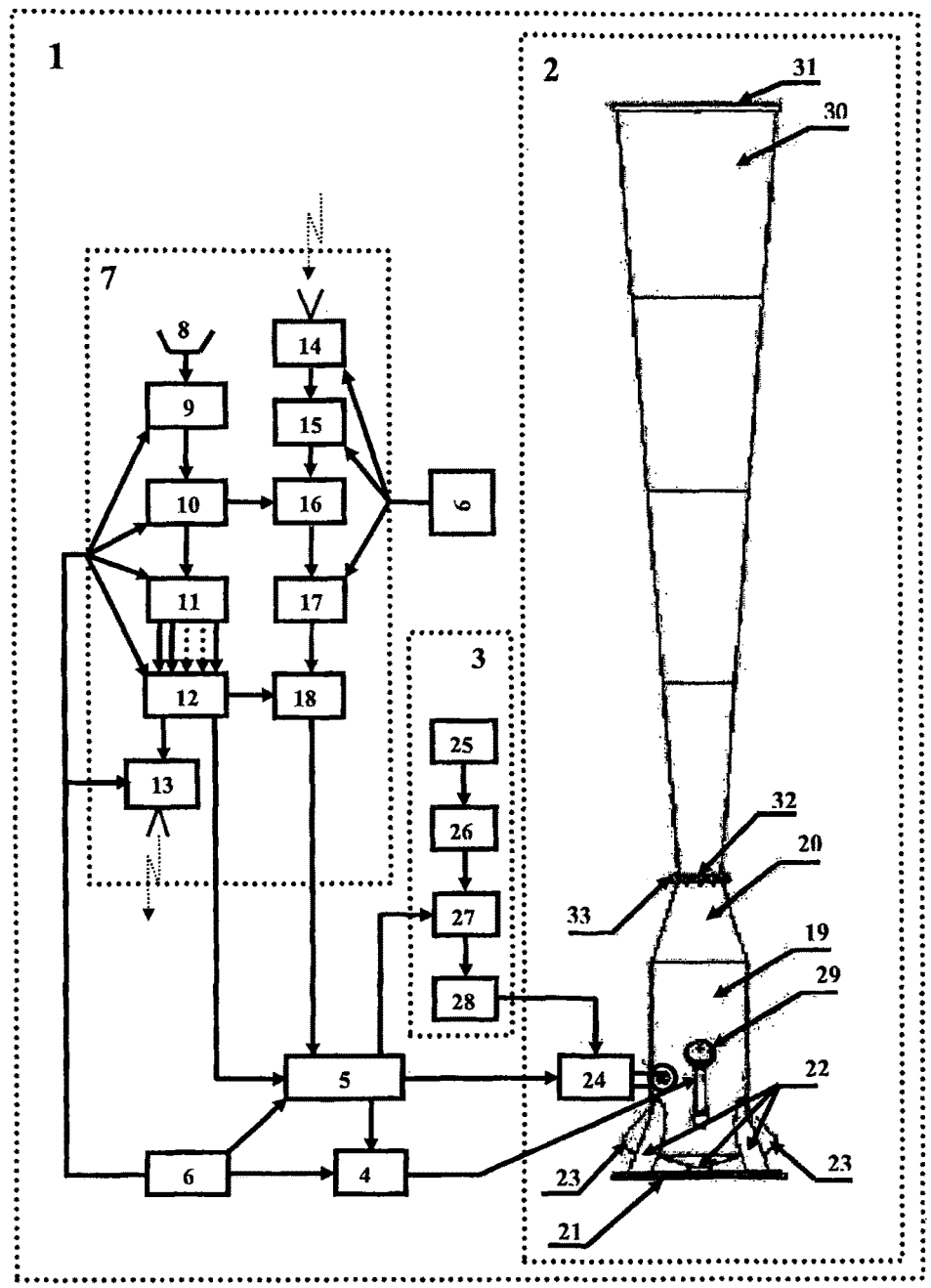
FIG. 2 is an outline of a first preferred embodiment of any one of M anti-hail protection systems of an automated wide-ranging anti-hail protection network.

FIG. 2 gives an overview of a first preferred embodiment of an anti-hail protection system (1) and shows the following high-level components and details thereof: a hail preventing sonic generator (2), a fuel supply system (3), an ignition means (4), a control means (5), a power supply (6), a detector-warner (detector-alerter) (7), an antenna (8), a radiometric receiver (9), a controlled compensation device (circuit) (10), a controlled multi-channel thresholder (11), a warning device (12), a transmitter (13), a receiver (14), a controlled code comparator (15), a first controlled switcher (16), a controlled single-channel thresholder (17), a second controlled switcher (18), a cylindrical combustion chamber (19) which may comprise a substantially cylindrical body with a rounded bottom and a rounded top portion which leads into a neck (20). The bottom of combustion chamber (19) is solidly mounted to a concrete pad (21) by feet (22). One or more air inlet ports (23) are provided with flaps (not shown) which are seated in ports (23) and open inwardly to provide one way valves for air rushing into combustion chamber (19) after each ignition. Combustion chamber (19) is provided with a fuel injector (24) which may be located in (inside) or on the combustion chamber (19) and which may comprise a solenoid valve controlling flow of combustible gas from a combustible fuel reservoir (25) of a fuel supply system (3) through a mechanical valve (26), a solenoid valve (27) and a pressure regulator (a pressure reducer) (28) into a central portion of combustion chamber (19). An igniter (29) which may comprise spark gap electrodes and an ignition means (4) which may comprise a high voltage generator coil are provided for igniting the combustible fuel injected into combustion chamber (19) and which may be located outside (FIG. 2) or inside (FIG. 6 and FIG. 7) of combustion chamber (19). Solenoid valve (27), fuel injector (24) and ignition means (4) are controlled by control means (5). A conical barrel (30) has a large diameter upper end (31) and a small diameter lower end (32) which is connected to an upper orifice (33) in neck (20) of combustion chamber (19).

Figure 3:
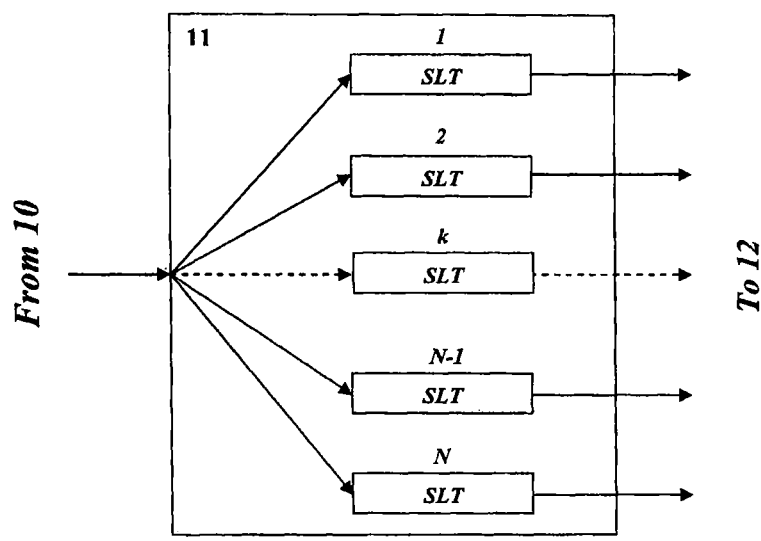
FIG. 3 is a detail block diagram of a preferred embodiment of a controlled multi-channel thresholder.

FIG. 3 shows the details of a possible embodiment of a controlled multi-channel thresholder (11) which includes N independent single level thresholders (SLT) with various threshold values.

Figure 4:
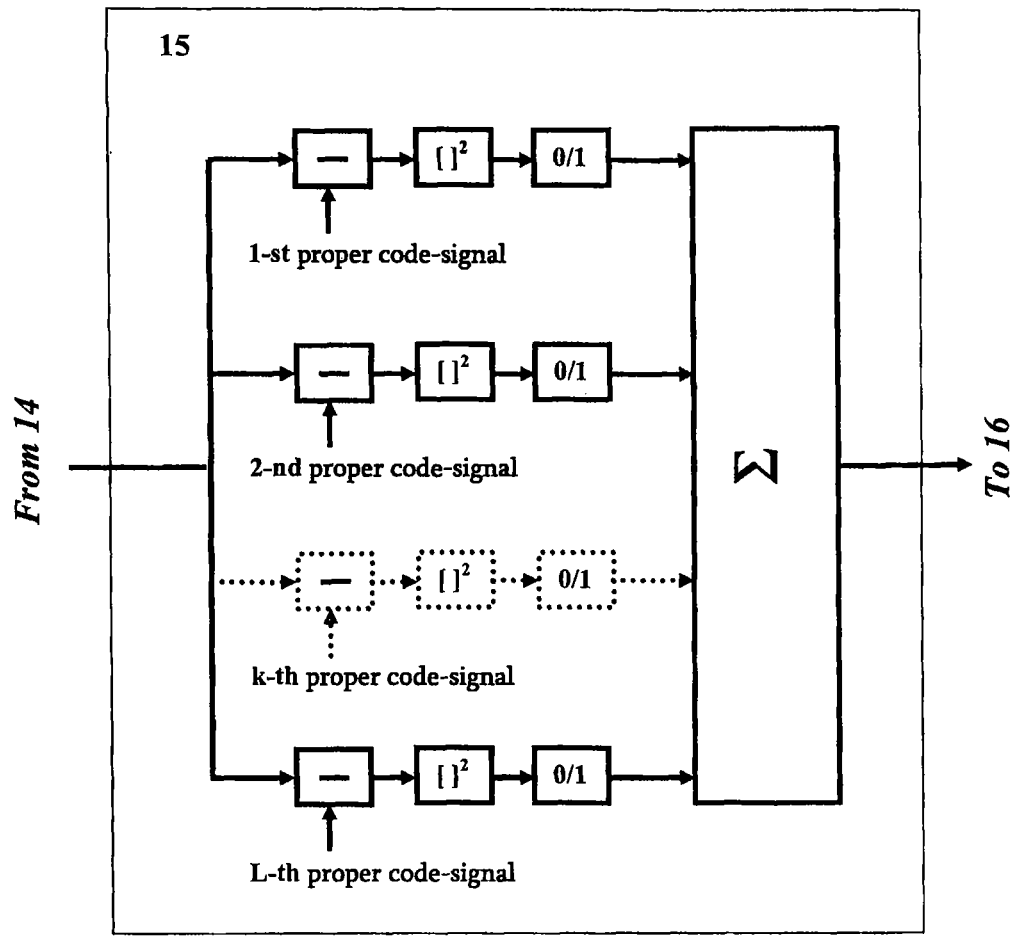
FIG. 4 is a detail block diagram of a preferred embodiment of a controlled code comparator.

FIG. 4 shows the details of a possible embodiment of a controlled code comparator (15) which includes L independent channels of comparison and an adder (Σ). Any one of L independent channels of comparison includes a subtracter (−), a squarer ([ ]²) and a reverse threshold circuit (0/1).

Figure 5:
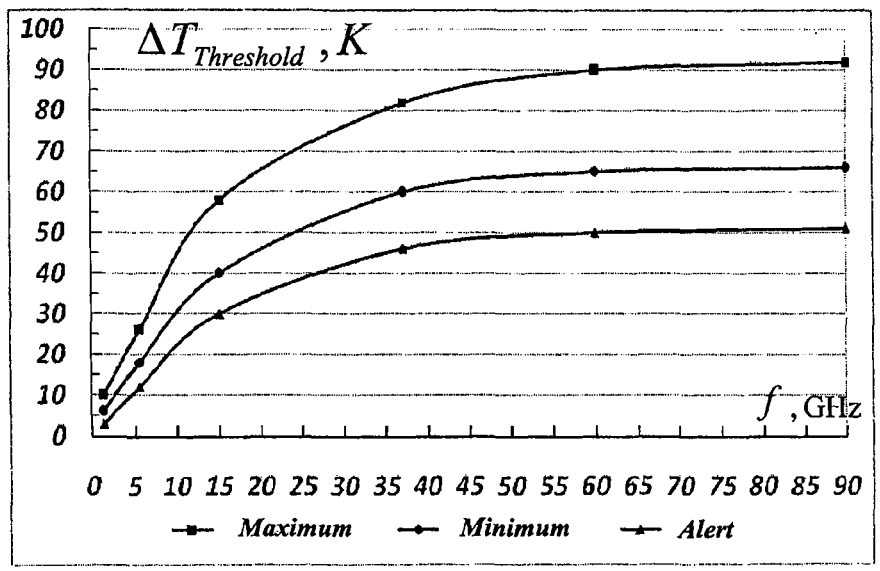
FIG. 5 is frequency diagrams of possible versions of a controlled multi-channel thresholder's maximum and minimum thresholds values and of a value of a controlled single-channel thresholder's alert threshold.

FIG. 5 shows possible values of maximum, minimum and alert thresholds levels at various frequencies.

Preferred modes of operation of the system of FIG. 2 are now described with reference to FIG. 1-FIG. 5. After initial starting (running) of the wide-ranging anti-hail protection network, that is after initial starting of any (each) of M anti-hail protection systems (1) of the wide-ranging anti-hail protection network, that is after opening corresponding mechanical valve (26) of each (any) of ant-hail protection system (1) and switching on corresponding power supply (6) which begins feed corresponding control means (5), corresponding ignition means (4) and corresponding detector-warner (7), each (any) anti-hail protection system of the network and the whole of anti-hail protection network continue their operation autonomous and automatically. Control means (5) of any (each) ant-hail protection system (1) opens corresponding solenoid valve (27) and sets corresponding hail preventing sonic generator (2) in a waiting mode of operation. Flow of the combustible gas through open corresponding solenoid valve (27) and corresponding pressure regulator (pressure reducer) (28) comes to the input of closed fuel injector (24) of corresponding hail preventing sonic generator (2). Up-directed antenna (8) of corresponding anti-hail protection system (1) observes the sky, receives continually signals of sky proper radiothermal emission and transfers them to the input of corresponding radiometric receiver (9). Radiometric receiver (9) processes received signals and outputs (transfers) to the input of corresponding controlled compensation device (circuit) (10) a signal corresponding to a sum of powers of signals of external emissions (from sky, surrounding (ambient) and external interference) and internal noises. Controlled compensation device (circuit) (10) compensates (reduces) a part of the incoming signals corresponding to clear air condition of sky observation and outputs remainder of the signals to the input of corresponding controlled multi-channel thresholder (11). In controlled multi-channel thresholder (11) the remainder of the signals is compared with N various threshold levels in N single level thresholders (SLT). Each single level thresholder (SLT) outputs "one" ("1") signal to the corresponding input of corresponding warning device (12) if its input signal exceeds the respective threshold, and a "zero" (naught, "0") signal otherwise. Warning device (12) records (processes) jointly received "one" and "zero" signals as a binary number in a binary code, creates a binary number code-signal corresponding to the recorded binary number, generates a warning code-signal in accordance with the binary number code-signal and outputs (transfers) generated warning code-signal to the input of corresponding transmitter (19) and to the input of corresponding control means (5) by electrical cords. Control means (5) sets the operation mode of corresponding hail preventing sonic generator (2) in accordance with the received warning code-signal, such as a switching-on mode, a waiting mode, an operating mode and a turning-off mode, and sets operation parameters, such as power (the combustible fuel quantity) and duration of detonations, number (frequency) of detonations and a detonation window. Control means (5) keeps corresponding hail preventing sonic generator (2) in a waiting mode of operation if received warning code-signal has the value "0". When control means (5) receives a warning code-signal with the value "1" or more it sets the operating mode of operation of corresponding hail preventing sonic generator (2), sets operation parameters of corresponding hail preventing sonic generator (2) in accordance with the value of the received warning code-signal, generates (creates) command (control) signals and runs (triggers, activates, starts) corresponding hail preventing sonic generator (2).

When hail preventing sonic generator (2) is operated, corresponding control means (5) causes combustible fuel to be released through corresponding fuel injector (24) into corresponding combustion chamber (19) until sufficient combustible gas for a full explosion resulting in a significant shock wave is present in corresponding combustion chamber (19). Mixing of the combustible fuel (combustible gas) with air in combustion chamber (19) is automatic and rapid. A short time after solenoid valve of fuel injector (24) is closed corresponding control means (5) triggers spark gap coil of corresponding ignition means (4) to create a high voltage pulse resulting in a spark across the electrodes of corresponding igniter (29). As the gas in combustion chamber (19) rapidly combusts, a shock wave results which is directed by corresponding conical barrel (30). The momentum of the combustion gases is directed upwardly, and once the combustion gases have fully expanded, the upward momentum of the gases causes a negative pressure to be created in combustion chamber (19) which results in corresponding flaps of corresponding air inlet ports (23) being drawn open so that fresh air may be drawn from ambient through air inlet ports (23) to fill corresponding combustion chamber (19).

It is important to select a fuel and ignition system which can operate even when rain water (ice, snow) passes through conical barrel (30) into corresponding combustion chamber (19). It is important to select the parameters of combustible fuel, combustion chamber (19) volume to corresponding upper orifice (33) size as well as corresponding conical barrel (30) dimensions in order that a good shock wave is generated and sufficient aspiration through corresponding air inlet ports (23) takes place in order to bring in sufficient fresh air for the next combustion.

Simultaneously with setting the operating mode of operation of hail preventing sonic generator (2) corresponding transmitter (13) generates and transmits on the air an alert code-signal.

When control means (5) receives the warning code-signal corresponding to the upper-range (maximum) value of the binary number $$P = \sum_{k=1}^{N} 2^{k-1}$$

results when "one" signal is transferred to any (each) of k=1÷N inputs of corresponding warning device (12) the control means (5) sets the turning-off mode of operation of corresponding anti-hail protection system (1), switches off corresponding hail preventing sonic generator (2) and interrupts detonations that is stops fuel injection and ignition. Control means (5) switches on corresponding hail preventing sonic generator (2) and resets for corresponding hail preventing sonic generator (2) the waiting mode of operation when it receives from corresponding warning device (12) next (next in turn) signal with the value "0" only.

The number N is defined on the basis of technical capabilities and performance to change operation parameters of corresponding hail preventing sonic generator (2), such as power and number of detonations, repetition frequency of detonations or a detonation window.

After initial starting of any (each) of M anti-hail protection systems (1) of the wide-ranging anti-hail protection network and simultaneously with setting the waiting mode of operation of any (each) of M hail preventing sonic generators (2) of the anti-hail protection network corresponding receiver (14) begins listening watch (ether) for reception alert code-signals transmitted on the air from other sites of the anti-hail protected area of M sites. Controlled code comparator (15) of corresponding receiver (14) compares outputs of corresponding receiver (14) with L proper code-signals of the corresponding site and generates an alert signal if received alert code-signal coincides with any of L proper code-signals of the corresponding site, and a "zero" (naught, "0") signal otherwise. Output signals of controlled code comparator (15) come to the controlled terminal (input) of corresponding first controlled switcher (16) which joins (connects, links) together input/output terminals of corresponding first controlled switcher (16) if an alert signal comes to the controlled terminal of corresponding first controlled switcher (16), and keeps disjoined (disconnected) input/output terminals of corresponding first controlled switcher (16) otherwise. First controlled switcher (16) with joined input/output terminals connects an output of corresponding controlled compensation device (circuit) (10) with an input of corresponding controlled single-channel thresholder (17), single-channel thresholder (17) compares accumulated signals of the corresponding site with an alert threshold and an alerting code-signal is generated and is outputted (is transferred) to the corresponding output of single-channel thresholder (17) if corresponding accumulated signal exceeds the alert threshold, and a "zero" (naught, "0") signal otherwise. The alerting code-signal passes (goes) through second controlled switcher (18) with joined input/output terminals and from the output terminal of second controlled switcher (18) is transferred by (through, via) electrical cords to the corresponding input of corresponding control means (5) which generates an alert command (control) signal and starts up corresponding hail preventing sonic generator (2) in accordance with generated alert command signal at (by, under) specified operational conditions of an alert operating mode of operation of hail preventing sonic generator (2). The alert operating mode of any hail preventing sonic generator (2) of any site of the anti-hail protected area of M sites is turned-off (switched-off) simultaneously with interrupting the alert code-signal corresponding to that site, that is when a "zero" signal comes from the output of corresponding controlled code comparator (15) to the controlled terminal of corresponding first controlled switcher (16), when corresponding first controlled switcher (16) disjoins its input/output terminals and by that way disconnects the output of corresponding controlled compensation device (circuit) (10) from the input of corresponding controlled single-channel thresholder (17). The alert operating mode of operation of any hail preventing sonic generator (2) of any site of the anti-hail protected area of M sites is turned-off (switched-off) as well simultaneously with setting the operating mode or the turning-off mode of operation of corresponding hail preventing sonic generator (2), when corresponding warning device (12) of that site generates a warning code signal with a value "1" and more, up to upper-range (maximum) value $$P = \sum_{k=1}^{N} 2^{k-1}$$

results when "one" signal is transferred to any (each) of $k=1 \div N$ inputs of corresponding warning device (12), then (when) corresponding second controlled switcher (18) disjoins (disconnects) its input/output terminals due to non-zero code-signals at its controlled terminal (input) and by that way disconnects the output of corresponding controlled single-channel thresholder (17) from the corresponding input of corresponding control means (5). This is a way to enhance operation efficiency of the wide-ranging anti-hail protection network and to automate its exploitation.

Figure 6:
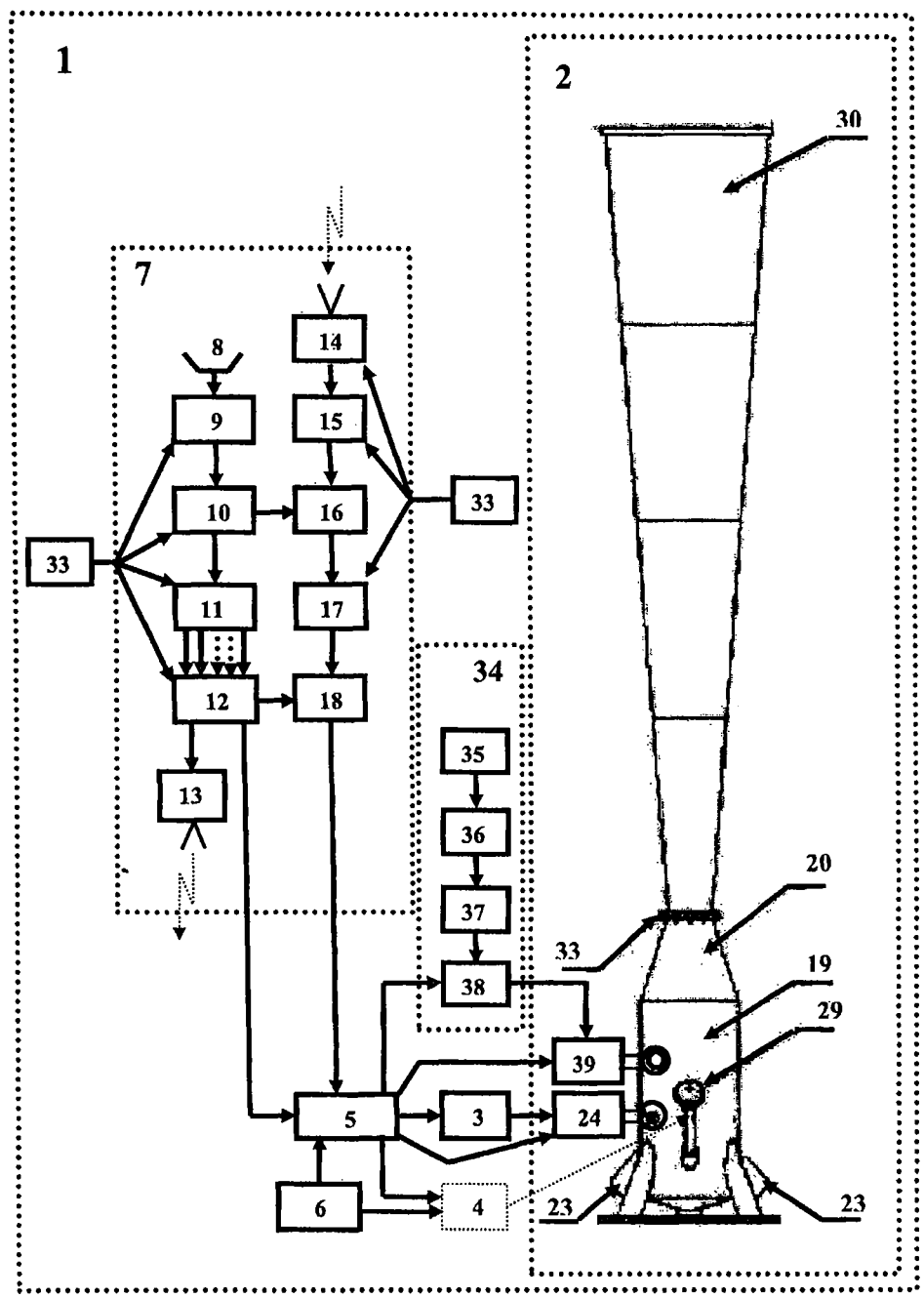
FIG. 6 is an outline of a second preferred embodiment of any one of M anti-hail protection systems of an automated wide-ranging anti-hail protection network with reagent injecting facilities and with a separate power supply of a detector-warner.

Detector-warner (7) may be mounted at any distance (close, near, not so far, far) away from corresponding hail preventing sonic generator (2) and, therefore, may have as well a separate power supply (33) as shown in FIG. 6.

If there is not a possibility to use electrical network ~110V or ~220V as a basic electrical source for power supply (6) and for separate power supply (33) then a preferred embodiment for both power supply (6) and separate power supply (33) is 12V or 24V DC rechargeable solar battery with a solar power panel.

Antenna (8) of any (each) of M anti-hail protection systems (1) may be directed to the sky under any elevation (vertical) and azimuth angles. Preferable elevation angle is from the interval 0-30° from the vertical. When detector-warner (7) is mounted close (near) to corresponding hail preventing sonic generator (2) then more preferable interval for radiometric observation is 0-10° from the vertical. Preferable azimuth direction for radiometric observation is the sector North West-North-North East, since it allows practically exclude the Sun direct influence on antenna at any time and at any season. For detector-warner (7) any kind of antenna may be used, e.g. horn, one mirror parabolic and hyperbolic, two mirrors (Cassegrainian) parabolic, dielectric, etc. with any beamwidth. Preferable antenna beamwidth is 10-20° at 3 dB level. Radiometric receiver (9) of any (each) of M anti-hail protection systems (1) may operate at any allowed central radio frequency from L to W-band of microwave (L, S, C, X, Ku, K, Ka, W), at any interference (noise) free bandwidth of receiving (reception) and at any polarization of sensing. Preferable bands for operation are X, Ku, K and Ka bands. For detector-warner (7) any type radiometric receiver may be used, such as a radiometer with a direct amplification, a superheterodyne radiometer, a noise-compensated (direct) radiometer, a Dick radiometer, a correlation radiometer, a crystal (detector) radiometer, etc. For radiometric receiver (9) preferred integration time is 1-5 second and preferred sensitivity is 0.1-0.5K in dependence on frequency band.

Detector-warner (7) should be mounted or it is necessary to mount detector-warner (7) under a convex radiolucent protective apron (shed, canopy, hovel) or/and to cover corresponding antenna (8) by radiolucent protective layer to prevent ice and liquid accumulation in front of corresponding antenna (8) and to protect corresponding antenna (8) and corresponding radiometric receiver (9) from direct influence of dust and precipitation, e.g. rain, snow, hail, etc. If the protective apron is constructed from a non-transparent or partially transparent material, then the apron should not cover (cut) the beam (the main lobe) of corresponding antenna (8).

Threshold levels of controlled multi-channel thresholder (11) depend on operation frequency (frequency band) of corresponding radiometric receiver (9). A curve of minimal threshold level's frequency dependence of FIG. 5 corresponds to a radiothermal contrast's frequency dependence of cumulonimbus clouds caused (generated) a rainfall with rare hail stones. Minimal values of radiothermal contrasts of FIG. 5 were estimated and approximated from the results of multi-frequency and dual polarization (vertical and horizontal) radiometric measurements carried out under elevation angles 20° and 30° of sensing and from the known theory of passive (radiometric) remote sensing. Theoretical approximations show that these curves are acceptable for elevation angles from the interval 0-30° as well.

Maximal threshold level's frequency dependence of FIG. 5 was estimated and approximated from the results of theoretical and experimental researches and corresponds to a radiothermal contrast's frequency dependence of cumulonimbus clouds caused (generated) a hard hail storm which is impossible to prevent by any technical means.

Alert threshold level of controlled single-channel thresholder (17) depends on operation frequency (frequency band) of corresponding radiometric receiver (9) and in dependence on frequency band of operation of corresponding radiometric receiver (9) is about 3-15K smaller than corresponding minimal threshold level. Alert threshold level's frequency dependence of FIG. 5 was estimated and approximated from the results of theoretical and experimental researches.

Radiothermal contrasts of FIG. 5 are given in Kelvin. Corresponding thresholds values in volts depend on structure and technical parameters of used (utilized) radiometric receiver (9) and may be defined from the results of theoretical estimations or from the results of experimental measurements and calibration. A preferable solution is to carry out preliminary calibration of radiometric receiver (9) in laboratory conditions or to carry out calibration of detector-warner (7) in field conditions.

A threshold interval between maximal and minimal thresholds levels of FIG. 5 may be divided in N−1 parts, where the dividing by 2 or 4 or 8 or 16, etc. parts that is when N=3 or 5 or 9 or 17 etc. is preferable. In dependence on application features (conditions) of the present method and the network of wide-ranging anti-hail protection the values of maximal, minimal and alert thresholds levels of FIG. 5 may be changed. When the value of minimal and alert thresholds levels of FIG. 5 is decreased then hail detection probability and false alarm are increased simultaneously. Taking into account a low exploitation expenditures (low price of combustible fuel) of hail preventing sonic generator (2), it is possible to agree with high false alarm probability and to decrease minimal and alert thresholds levels of FIG. 5 by 2-10K in dependence on operation frequency of corresponding radiometric receiver (9).

It is possible to save material resources and to decrease exploitation expenditures of hail preventing sonic generator (2) by decreasing the values of maximal threshold levels of FIG. 5 which will cause increasing of a target (hail storm) drop-out probability.

Maximal, minimal and alert thresholds levels may be corrected and may be changed individually during the exploitation of corresponding anti-hail protection system (1) by corresponding controlled multi-channel thresholder (12) and by corresponding controlled single-channel thresholder (17).

The hail preventing sonic generator's (2) impact area is limited in a size and usually is about 500-600 m in a radius over the generator. Therefore, the hail preventing sonic generator is mounted (is built) near protected agricultural fields and lands and is set in its waiting mode of operation after clarification of the value of a compensation signal of controlled compensation device (circuit) (10). The value of the compensation signal for hail preventing sonic generator (2) work area is defined experimentally for each protected area individually by averaging the results of measurements of clear sky brightness temperatures (more exact antenna or apparent temperatures) carried out during days and nights under (for, at) various ambient (near surface) air temperatures 10-30° C.

FIG. 6 shows second preferred embodiment of anti-hail protection system (1) with reagent injecting facilities in respect to the embodiment of FIG. 2. For sake of conciseness, only the differences with respect to the embodiment of FIG. 2 are discussed below. FIG. 6 shows in addition the following high-level components and details thereof: a reagent supply system (34), a reagent reservoir (35), a reagent mechanical valve (36), a reagent solenoid valve (37), a reagent pressure regulator (38) for providing required pressure for reagent injection, and a reagent injector-mixer (38) for injecting a reagent together with the combustible fuel into corresponding combustion chamber (19) and mixing the reagent with the combustible fuel before the combustible fuel detonating. Reagent injector-mixer (38) which is controlled by corresponding control means (5) may comprise a solenoid valve controlling flow of the reagent from corresponding reagent reservoir (35) of corresponding reagent supply system (34) through corresponding reagent mechanical valve (36), corresponding reagent solenoid valve (37) and corresponding reagent pressure regulator (38) into a central portion of corresponding combustion chamber (19). Reagent mechanical valve (36) is opened together with corresponding mechanical valve (26). Reagent injector-mixer (39) is opened and is closed by corresponding control means (5) simultaneously with corresponding fuel injector (24) or so.

When detector-warner (7) is mounted not so far (away) from corresponding hail preventing sonic generator (2) then it is preferable to transfer the warning code-signal generated (created) by corresponding warning device (12) and the alerting code-signal generated (created) by corresponding controlled single-channel thresholder (17) to corresponding control means (5) by (through, via) electrical cords. When detector-warner (7) is mounted far (away) from corresponding hail preventing sonic generator (2) then it is preferable to control hail preventing sonic generator (2) remotely and transfer the warning code-signal generated by corresponding warning device (12) and the alerting code-signal generated by corresponding controlled single-channel thresholder (17) to corresponding control means (5) by means of cell phone GSM system, by radio aids (by radio technical devices), by means of radio communication, by means of telephone communication, or by other technical means of communication.

Figure 7:
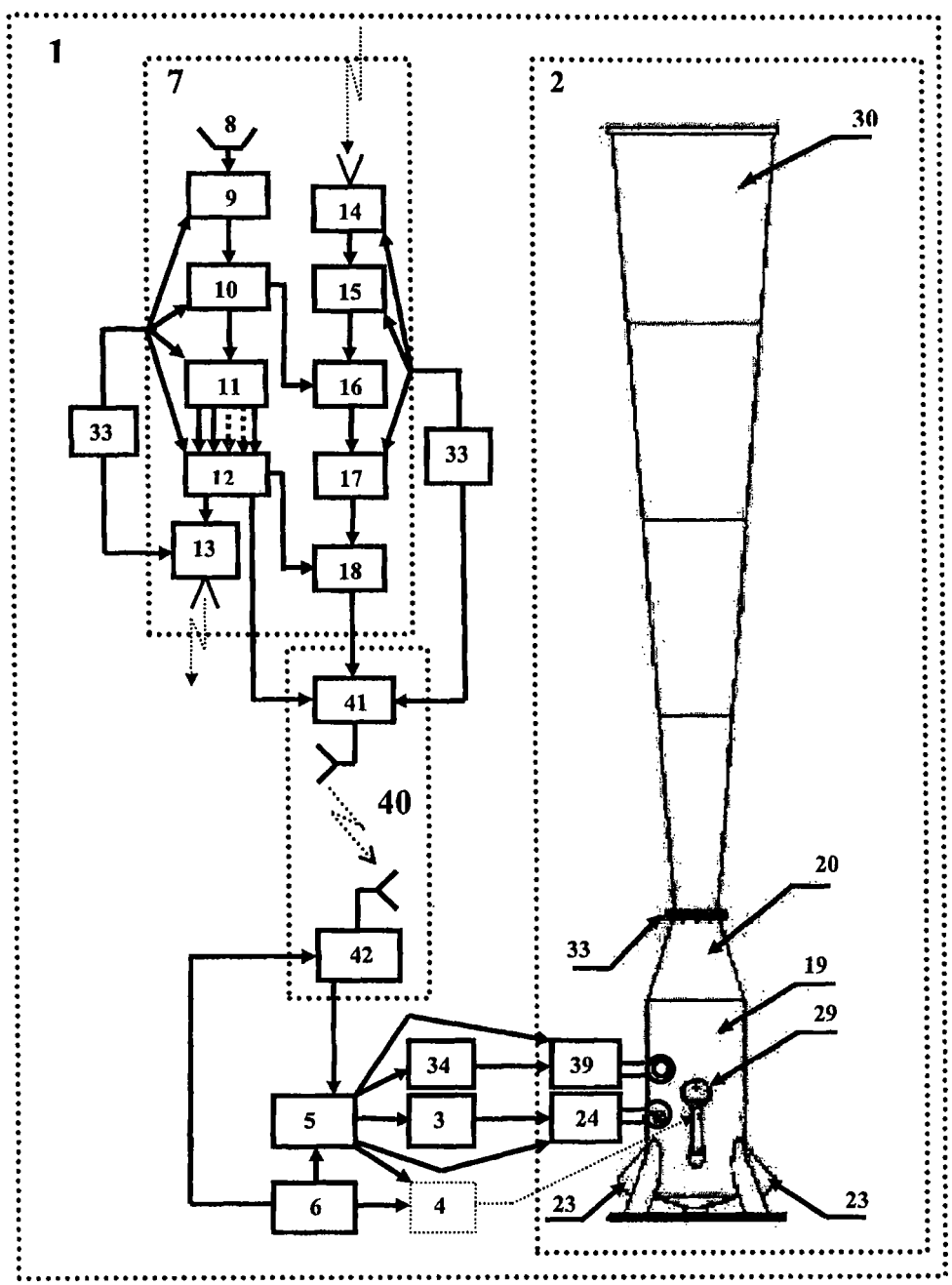
FIG. 7 is an outline of a third preferred embodiment of any one of M anti-hail protection systems of an automated wide-ranging anti-hail protection network with reagent injecting facilities, with a separate power supply and with a remote control facilities.

FIG. 7 gives an overview of third alternative preferred embodiment of anti-hail protection system (1) which is controlled remotely. For sake of conciseness, only the differences with respect to the embodiments of FIG. 2 and FIG. 6 are discussed below. FIG. 7 shows in addition the following high-level components and details thereof: a remote control system (40), a controlling transmitter (a controlling transmitting phone) (41) for transmitting created warning and alerting code-signals, a controlling receiver (a controlling receiving phone) (42) for receiving transmitted warning and alerting code-signals and transferring received warning and alerting code-signals by (through, via) electrical cords to corresponding control means (5).

When detector-warner (7) is located far (away) from corresponding hail preventing sonic generator (2) its antenna (8) should be directed under the elevation angle providing a footprint at ~3.5 km altitude just above corresponding site of protected agricultural area.

Figure 8:
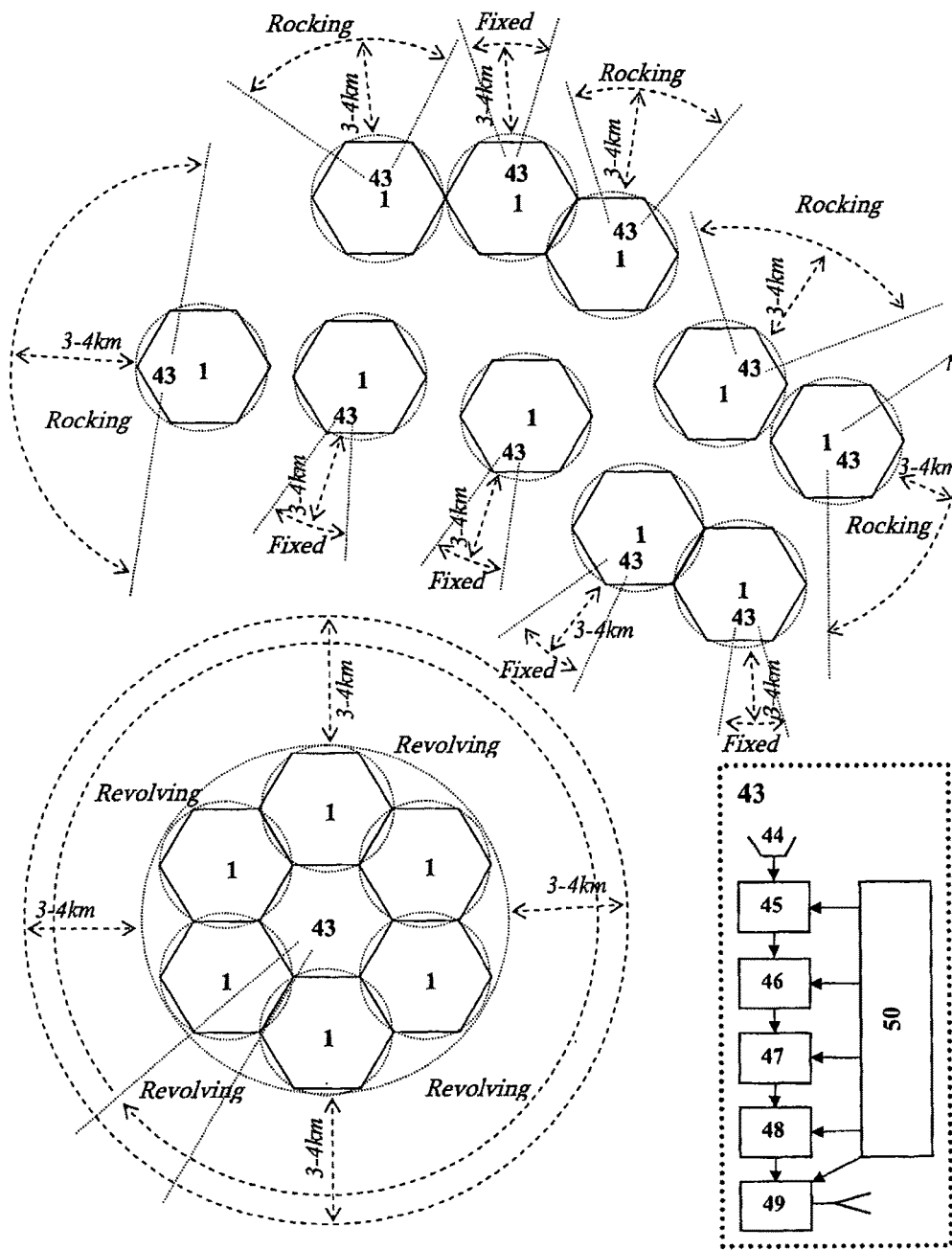
FIG. 8 is an outline of a second possible version of a spatial distribution of an embodiment of an automated wide-ranging anti-hail protection network with a complex of spatially distributed K teledetection systems and with an outline of a preferred embodiment of any one of K teledetection systems.

An automate exploitation or a self-management (self-controlling) of the wide-ranging anti-hail protection network may be realized as well by a teledetection complex of K teledetection systems (43) which serves the anti-hail protected area of M sites as shown in FIG. 8. The teledetection complex of K teledetection systems (43) is used for far-ranging hail (hail clouds) detection over an adjacent land all around the anti-hail protection area of M sites at a horizontal distance 3-4 km far from the edge (boundary) of the anti-hail protection area of M sites and at the altitude 3.5 km and for alerting by transmitting on the air the alert code-signal on gathering (coming, impending) hail danger from a specified adjacent land of the anti-hail protection area of M sites.

The number K depends on the kind (type) of a spatial distribution of M sites and it may have a value from the interval [1÷M], e.g. if M sites are spatially distributed around a common center a possible embodiment of which is separately presented in FIG. 8, then it will be possible to use only one (K=1) teledetection system (43). If all M sites are located one far from another then for entire serving of the anti-hail protection area of M sites it will be necessary to use K=M teledetection systems (43).

Any one of K teledetection systems (43) comprises a far-ranging antenna (44) for receiving signals of the adjacent land corresponding sky proper radio thermal emission, a far-ranging radiometric receiver (45) for measuring a power of the received signals of the adjacent land corresponding sky proper radio thermal emission and for estimating of the adjacent land corresponding sky brightness (apparent) temperature, far-ranging radiometric receiver (45) being in electrical communication with corresponding far-ranging antenna (44), a far-ranging controlled compensation device (circuit) (46), far-ranging controlled compensation device (46) being in electrical communication with corresponding far-ranging radiometric receiver (45), a far-ranging controlled single-channel thresholder (47) for far-ranging hail detection, far-ranging controlled single-channel thresholder (47) being in electrical communication with corresponding far-ranging controlled compensation device (46), a far-ranging warning device (48) for creation the alert code-signal on gathering hail danger from the adjacent land, far-ranging warning device (48) being in electrical communication with corresponding far-ranging controlled single-channel thresholder (47), a far-ranging transmitter (49) for transmitting on the air the alert code-signal on gathering hail danger from the adjacent land, far-ranging transmitter (49) being in electrical communication with corresponding far-ranging warning device (48), and a far-ranging power supply (50), far-ranging power supply (50) being in electrical communication with corresponding far-ranging radiometric receiver (45), with corresponding far-ranging controlled compensation device (circuit) (46), with corresponding far-ranging controlled single-channel thresholder (47), with corresponding far-ranging warning device (48) and with corresponding far-ranging transmitter (49).

In dependence on the kind of M sites' spatial distribution far-ranging antenna (44) under specified (fixed) elevation angle of observation may periodically revolve in azimuth plane to monitor currently (permanently) the adjacent land sky all around the anti-hail protection area of M sites, may periodically rock (scan) within a specified azimuth sector to monitor currently (permanently) a specified sector of sky of the adjacent land or may uninterrupted observe a specified part (point) of the sky of the adjacent land at specified (fixed) azimuth angle of observation. Spatial disposition of any teledetection system (43) and the elevation angle of observation of far-ranging antenna (44) are defined from the assumption (the condition) that the footprint of far-ranging antenna (44) beam at the altitude of 3.5 km should be located above (over) the adjacent land located 3-4 km far from the corresponding edge (boundary) of the anti-hail protection area.

As far-ranging antenna (44) any kind of antenna may be used, e.g. horn, one mirror parabolic and hyperbolic, two mirrors (Cassegrainian) parabolic, dielectric, etc. with any beamwidth. Preferable antenna beamwidth for far-ranging antenna (44) is 10-20° at 3 dB level. The far-ranging radiometric receiver (45) of any (each) of K teledetection systems (43) may operate at any allowed central radio frequency from L to W-band of microwave (L, S, C, X, Ku, K, Ka, W), at any interference (noise) free bandwidth of receiving (reception) and at any polarization of sensing. Preferable bands for operation are X, Ku, K and Ka. As far-ranging radiometric receiver (45) any kind of (type) radiometric receiver may be used, such as a radiometer with a direct amplification, a superheterodyne radiometer, a noise-compensated (direct) radiometer, a Dick radiometer, a correlation radiometer, a crystal (detector) radiometer, etc. For far-ranging radiometric receiver (45) preferred integration time is 1-5 second and preferred sensitivity is 0.1-0.5K in dependence on frequency band. A preferable azimuth direction for a radiometric observation by teledetection system (43) at (under) fixed (specified) azimuth angle of observation is the sector North West-North-North East, since it will allow practically exclude the Sun direct influence on far-ranging antenna (44) at any time and at any season.

Any teledetection system (43) should be mounted or it is necessary to mount any teledetection system (43) under a convex radiolucent protective apron (shed, canopy, hovel) or/and to cover far ranging antenna (44) by radiolucent protective layer to prevent ice and liquid accumulation in front of far-ranging antenna (44) and to protect far-ranging antenna (44) and far-ranging radiometric receiver (45) from direct influence of dust and precipitation, e.g. rain, snow, hail, etc. If the protective apron is constructed from a non-transparent or partially transparent material, then the apron should not cover (cut) the beam (the main lobe) of far ranging antenna (44).

For operating teledetection system (43) with revolving (rotating) or rocking (scanning) far-range antenna (44) it is necessary to take into account sun direct influence and interference.

As far-ranging transmitter (49) any kind of radio waves transmitter may be used, e.g. cell phone GSM system, etc. with a separate or common power supply, that is far-ranging power supply (50).

When any of K teledetection systems (43) detects hail (hail cloud) at a specified azimuth angle of observation it creates and transmits on the air the alert code-signal on (about) gathering (coming, impending) hail danger from the adjacent land of a specified azimuth direction which is received by any of receivers (14) of M detector-warners (7). Received by any receiver (14) the alert code-signal on (about) gathering (coming, impending) hail danger from the adjacent land of a specified azimuth direction is compared in (by) corresponding controlled code comparator (15) with L proper code-signals of the corresponding site, one of which is coincided with the alert code-signal on gathering hail danger from the corresponding adjacent land are located under a specified azimuth direction, and if received alert code-signal on gathering hail danger from the adjacent land coincides with one of L proper code-signals of the corresponding site then the alert operation mode is set for corresponding hail preventing sonic generator (2) by (in accordance with) the above described way.

When for anti-hail protection a teledetection complex is used, then the number L may reach up to 7-9.

A transmission of the alert code signal on gathering hail danger from the adjacent land of a specified azimuth direction may be performed by radio aids (by radio technical devices), by means of cell phone GSM system or by other technical means of communication.

Far-ranging power supply (50) may comprise 12V or 24V DC rechargeable solar battery with a solar power panel or may use electrical network ~110V or ~220V as a basic electrical source.

Minimal threshold level of any (each) of K far-ranging teledetection systems (43) may be corrected and may be changed individually during its exploitation by corresponding controlled far-ranging controlled single-channel thresholder (47).

Any of K far-ranging teledetection systems (43) is set in its working (operating) mode of operation after clarification of the value of a compensation signal of corresponding far-ranging controlled compensation device (46). The value of the compensation signal for any of K far-ranging teledetection systems (43) location point (area) is defined experimentally for each point (area) individually by averaging the results of measurements of clear sky brightness temperatures (more exact antenna or apparent temperatures) carried out during days and nights under (for, at) various ambient (near surface) air temperatures 10-30° C.

Figure 9:
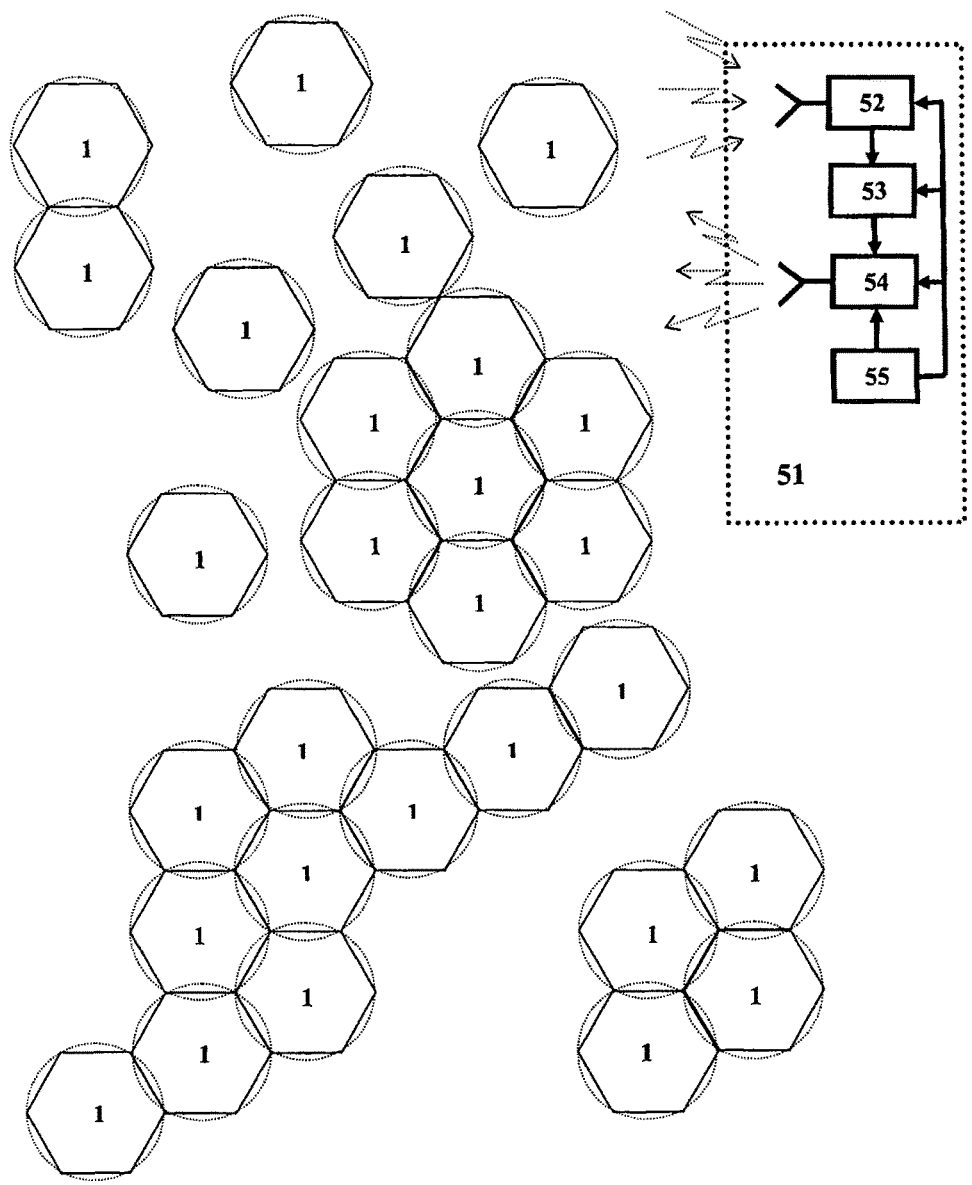
FIG. 9 is an outline of a third possible version of a spatial distribution of an embodiment of an automated wide-ranging anti-hail protection network with a main controlling center and with an outline of a preferred embodiment of the main controlling center.

An automate exploitation or a self-management (self-controlling) of the wide-ranging anti-hail protection network may be realized as well by a main controlling center (51) as shown in FIG. 9. Main controlling center (51) comprises a main receiver (52) for reception of the alert code-signal or/and the alert code-signal on gathering hail danger from the adjacent land, a processor-analyser (53) for processing and analysis of the alert code-signal or/and the alert code-signal on gathering hail danger from the adjacent land, processor-analyser (53) being in electrical communication with corresponding main receiver (52), a main transmitter (54) for retransmission of the alert code-signal or/and the alert code-signal on gathering hail danger from the adjacent land, main transmitter (54) being in electrical communication with corresponding processor-analyser (53), and a main power supply (55), main power supply (55) being in electrical communication with corresponding main receiver (52), with corresponding processor-analyser (53) and with corresponding main transmitter (54). Reception and retransmission of the alert code signal on gathering hail danger may be performed by means of cell phone GSM system, by radio aids (by radio technical devices), by means of radio communication, by means of telephone communication, or by other technical means of communication.

Main controlling center (51) receives transmitted on the air the alert code-signal or/and the alert code-signal on gathering hail danger from the specified adjacent land, processes the received alert code-signal or/and the alert code-signal on gathering hail danger from the specified adjacent land and retransmits on the air by radio waves the processed alert code-signal or/and the alert code-signal on gathering hail danger from the specified adjacent land which is received in each (any) site of the anti-hail protected area of M sites.

Main controlling center (51) may be located inside or outside of the anti-hail protected area of M sites and may be feed by main power supply (55) or by power supply (6) or by separate power supply (33). If there is not a possibility to use electrical network ~110V or ~220V as a basic electrical source for main power supply (55) then a preferred embodiment for main power supply (55) is 12V or 24V DC rechargeable solar battery with a solar power panel.

Detail descriptions of structural, technical, operational and application features of hail preventing sonic generator (2) are presented in. Although, in is mentioned that for more efficiency air inlet ports' (23) area should be at least 1.2 times larger of corresponding upper orifice (33) area of corresponding neck (20) and corresponding igniter (29) should be placed in the geometrical center of corresponding combustion chamber (19), the ratio of areas of upper orifice (33) of corresponding neck (20) and corresponding air inlet ports (23) and the place of location of corresponding igniter (29) may be varied in dependence on geographical and climatological conditions of the location (position) of corresponding hail preventing sonic generator (2) of corresponding anti-hail protection system (1).

Detail descriptions of operational and application features of reagent supply system (34) and reagent injector-mixer (39) are presented in.

Types and applications of remote control system (40) are presented and are discussed in.

Methods and realizations of hail preventing sonic generator's (2) automatic switching off at alert conditions and possible methods of organization of security of anti-hail protection system (1) work territory of (from) external attacks or encroachments are discussed in detail in.

The invention claimed is:

1. An automated wide-ranging anti-hail protection network, comprising:
an anti-hail protection system of a plurality of anti-hail protection systems, each of the plurality of anti-hail protection systems located at a corresponding site within one of a plurality of hail-protected areas, wherein the anti-hail protection system includes:
a hail preventing sonic generator configured to send shock waves upwardly to the sky to disrupt formation of hail;
a controller configured to control a mode of operation of the hail preventing sonic generator; and
a detector-warner device configured to perform hail detection and command the controller, the detector-warner device including
an antenna configured to receive signals corresponding to sky-intrinsic emissions in radiofrequencies for the corresponding site of the anti-hail protection system,
a radiometric receiver configured to measure a power of the received signals of the sky-intrinsic emissions and estimate a sky-apparent temperature for the corresponding site,
a transmitter configured to transmit alert code-signals responsive to the corresponding site sky-intrinsic emissions exceeding a predetermined threshold value,
a receiver configured to receive alert code-signals transmitted from another of the plurality of anti-hail protection systems, and a controlled code comparator configured to compare alert code-signals with proper alert code-signals of the corresponding site and command the controller to cause the hail preventing sonic generator to disrupt hail formation responsive to the alert code-signals matching the corresponding site.

2. The automated wide-ranging anti-hail protection network of claim 1, wherein the anti-hail protection system includes:
a far-ranging antenna configured to receive signals corresponding to sky-intrinsic emissions in radiofrequencies for sites on adjacent land to the site of the anti-hail protection system;
a far-ranging radiometric receiver in communication with the far-ranging antenna and configured to measure a power of the received signals and estimate sky apparent temperature of the adjacent land;
a far-ranging controlled compensation device in communication with the far-ranging radiometric receiver;
a far-ranging controlled single-channel thresholder in electrical communication with the far-ranging controlled compensation device and configured to perform far-ranging hail detection;
a far-ranging warning device in communication with the far-ranging controlled single-channel thresholder and configured to create the alert code-signal on gathering hail danger from the adjacent land;
a far-ranging transmitter in communication with the far-ranging warning device and configured to transmit the alert code-signal on gathering hail danger from the adjacent land.

3. The automated wide-ranging anti-hail protection network of claim 1, wherein the hail preventing sonic generator is configured to generate the shock waves by detonating an explosive mixture of combustible gas and air in an enclosed body directed to aim the detonation upwardly to the sky.

4. The automated wide-ranging anti-hail protection network of claim 1, wherein the hail preventing sonic generator includes:
a fuel supply system configured to inject combustible fuel to the hail preventing sonic generator;
an igniter configured to generate a high voltage spike to igniting the combustible fuel in the hail preventing sonic generator; and
a controller, in electrical communication with the fuel supply system and the igniter, configured to control the fuel supply system and the igniter.

5. The automated wide-ranging anti-hail protection network of claim 1, wherein the radiometric receiver operates on a microwave frequency band.

6. The automated wide-ranging anti-hail protection network of claim 1, wherein the predetermined threshold value is based on a frequency band of operation of the radiometric receiver.

7. The automated wide-ranging anti-hail protection network of claim 1, wherein determining the sky-intrinsic emission exceeds a predetermined threshold value includes:
squaring the received signals of sky proper radio thermal emission;
accumulating the squared signals; and
comparing the accumulated signals with the predetermined threshold value.

8. The automated wide-ranging anti-hail protection network of claim 7, wherein determining the sky-intrinsic emission exceeds a predetermined threshold value includes compensating the incoming signals to correspond to a clear air condition.

9. The automated wide-ranging anti-hail protection network of claim 8, wherein determining the sky-intrinsic emission exceeds a predetermined threshold value includes comparing the compensated signals with corresponding thresholds by a multichannel thresholder.

10. The automated wide-ranging anti-hail protection network of claim 1, wherein the controller selects the mode of operation of the hail preventing sonic generator from (i) a waiting mode, (ii) a switching-on mode, (iii) an operating mode, and (iv) a turning-off mode.

11. The automated wide-ranging anti-hail protection network of claim 10, wherein (i) the waiting mode maintains the hail preventing sonic generator in operational readiness, (ii) the switching-on mode engages the hail preventing sonic generator and transitions to the operating mode, (iii) the operating mode operates the hail preventing sonic generator, and (iv) the turning-off mode disengages the hail preventing sonic generator and transitions to the waiting mode.

12. An automated wide-ranging anti-hail protection method, comprising:
measuring signals of sky radio thermal emission radiofrequencies using a radiometric receiver to identify clouds using at least one of a plurality of sites of an anti-hail protected area network;
providing a signal corresponding to a sum of powers of the signal of external emissions;
comparing the signal with a corresponding threshold, and generating an output signal responsive to the accumulated signal exceeding the threshold, the output signal indicating the accumulated signal exceeded the threshold;
transmitting a code-signal in accordance with the output signal to a controller of a hail preventing sonic generator of the site;
comparing received code-signals with proper alert code-signals of the site; and
commanding the hail preventing sonic generator to send shock waves upwardly to the sky to disrupt formation of hail responsive to the alert code-signals matching the alert code-signals of the site.

13. The automated wide-ranging anti-hail protection method of claim 12, wherein the plurality of anti-hail protection systems of the wide-ranging anti-hail protection network are arranged as a complex of spatially-distributed systems configured to provide far-ranging hail detection over a plurality of adjacent land sites surrounding the corresponding site of the anti-hail protection system and to alert, via wireless transmission, the alert code-signals indicative of gathering hail danger from any of the adjacent land sites surrounding the corresponding site.

14. The automated wide-ranging anti-hail protection method of claim 12, further comprising compensating a part of the incoming signals corresponding to clear air condition of sky observation.

15. The automated wide-ranging anti-hail protection method of claim 12, further comprising, generating the shock waves using the hail preventing sonic generator by detonating an explosive mixture of combustible gas and air in a combustion chamber directed to aim the detonation upwardly to the sky.

16. The automated wide-ranging anti-hail protection method of claim 12, further comprising:
injecting, by a fuel supply system, combustible fuel to the hail preventing sonic generator;
generating, by an igniter, a high voltage spike to ignite the combustible fuel in the hail preventing sonic generator; and controlling, by a controller in electrical communication with the fuel supply system and the igniter, the fuel supply system and the igniter.

17. The automated wide-ranging anti-hail protection method of claim 12, wherein the radiometric receiver operates on a microwave frequency band.

18. The automated wide-ranging anti-hail protection method of claim 12, wherein the predetermined threshold value is based on a frequency band of operation of the radiometric receiver.

19. The automated wide-ranging anti-hail protection method of claim 12, wherein determining the sky-intrinsic emission exceeds a predetermined threshold value includes:
   squaring the received signals of sky proper radio thermal emission;
   accumulating the squared signals; and
   comparing the accumulated signals with the predetermined threshold value.

20. The automated wide-ranging anti-hail protection method of claim 19, wherein determining the sky-intrinsic emission exceeds a predetermined threshold value includes compensating a part of the incoming signals corresponding to clear air condition of sky observation into remainder signals.

21. The automated wide-ranging anti-hail protection method of claim 20, wherein determining the sky-intrinsic emission exceeds a predetermined threshold value includes comparing the remainder signals with corresponding thresholds by a multichannel thresholder.

22. The automated wide-ranging anti-hail protection method of claim 12, further comprising selecting a mode of operation of the hail preventing sonic generator from (i) a waiting mode, (ii) a switching-on mode, (iii) an operating mode, and (iv) a turning-off mode, wherein (i) the waiting mode maintains the hail preventing sonic generator in operational readiness, (ii) the switching-on mode engages the hail preventing sonic generator and transitions to the operating mode, (iii) the operating mode operates the hail preventing sonic generator, and (iv) the turning-off mode disengages the hail preventing sonic generator and transitions to the waiting mode.

* * * * *